United States Patent [19]
Lee

[11] Patent Number: 5,757,762
[45] Date of Patent: May 26, 1998

[54] DISK CENTERING APPARATUS FOR A COMPACT DISK DRIVE

[75] Inventor: Sang-jun Lee, Suwon, Rep. of Korea

[73] Assignee: Samsung Electronics Co., Ltd., Kyungki-Do, Rep. of Korea

[21] Appl. No.: 677,212

[22] Filed: Jul. 9, 1996

[30] Foreign Application Priority Data

Jan. 8, 1996 [KR] Rep. of Korea .................. 96-210

[51] Int. Cl.$^6$ .................. G11B 23/00; G11B 17/028
[52] U.S. Cl. .................................................. 369/271
[58] Field of Search .......................... 369/263, 270, 369/271; 360/98.08, 99.05, 99.12, 98.07, 99.04, 99.08, 97.01

[56] References Cited

U.S. PATENT DOCUMENTS

| | | | |
|---|---|---|---|
| 4,723,648 | 2/1988 | Hamatami | 369/270 |
| 4,827,469 | 5/1989 | Peeters | 369/270 |
| 5,001,700 | 3/1991 | Rowden et al. | 369/270 |
| 5,557,486 | 9/1996 | Akagi et al. | 360/97.01 |

*Primary Examiner*—Stuart S. Levy
*Assistant Examiner*—George J. Letscher
*Attorney, Agent, or Firm*—Sughrue, Mion, Zinn, Macpeak & Seas, PLLC

[57] ABSTRACT

A disk centering apparatus of a compact disk drive including a metal ball having a high moment of inertia and a spring for elastically biasing the metal ball toward the turntable. The ball is disposed in the center of the pulley spindle to prevent pickup errors by reducing the vibration generated during high-speed disk rotation.

6 Claims, 2 Drawing Sheets

DISK CENTERING APPARATUS FOR A COMPACT DISK DRIVE

BACKGROUND OF THE INVENTION

Field of the Invention

The present invention relates to a disk centering apparatus of a compact disk drive, and more particularly, to a disk centering apparatus of a compact disk drive, having elastic pressing means for pressing a turntable.

A conventional disk centering apparatus of a compact disk drive, as shown in FIG. 1, is provided with a pulley spindle 11 for pressing a turntable 12 to prevent deviation of the disk 10, and a holder chuck 13 for preventing eccentric movement of the pulley spindle 11.

Generally, the center of gravity of the compact disk 10 is eccentric due to inherent inaccuracies in the molding process used to manufacture the compact disk 10. When the compact disk 10 having the eccentric center of gravity is rotated at high speed by a spindle motor 14 during operation of the disk drive, the compact disk 10 can vibrate severely. Thus, data recorded on the disk 10 cannot be read accurately, or the vibrating compact disk 10 comes into contact with other components of the disk drive, thereby causing noise and failure.

To solve the above-mentioned problems, the conventional disk centering apparatus is provided with a pulley spindle 11 and a rubber damper 15 for clamping and supporting the disk 10. However, the rubber damper 15 cannot effectively prevent the vibration of the disk 10 during high speed rotation. As a result, the vibration of the disk 10, which occurs due to the eccentricity of the center of gravity of the compact disk 10, can cause the body of the pulley spindle 11 to come into contact with the holder chuck 13. This causes noise and pickup errors.

SUMMARY OF THE INVENTION

Accordingly, it is an object of the present invention to provide a disk centering apparatus of a compact disk drive having pressing means, having a high moment of inertia for elastically pressing a a turntable on a disk is disposed, to reduce vibration of the disk and to prevent pickup errors.

To accomplish the above object, the invention is a disk centering apparatus of a compact disk drive having a turntable and a pulley spindle for clamping the disk, comprising, a bracket spindle, having a through-hole formed in the center thereof, disposed on the bottom surface of the inside of the pulley spindle, a metal ball, having a larger diameter than that of the through-hole, seated on the through-hole of the bracket spindle, a spring for elastically biasing the metal ball toward the bracket spindle to press the turntable, and a ball guide plate, for supporting the spring and the metal ball, connected to the pulley spindle.

The disk centering apparatus of a compact disk drive according to the present invention suppresses the vibration which occurs due to the eccentric center of gravity of the disk during high-speed rotation, to thereby prevent pickup errors. Also, the invention can be applied to various kinds of disks regardless of the eccentricity of the disk.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
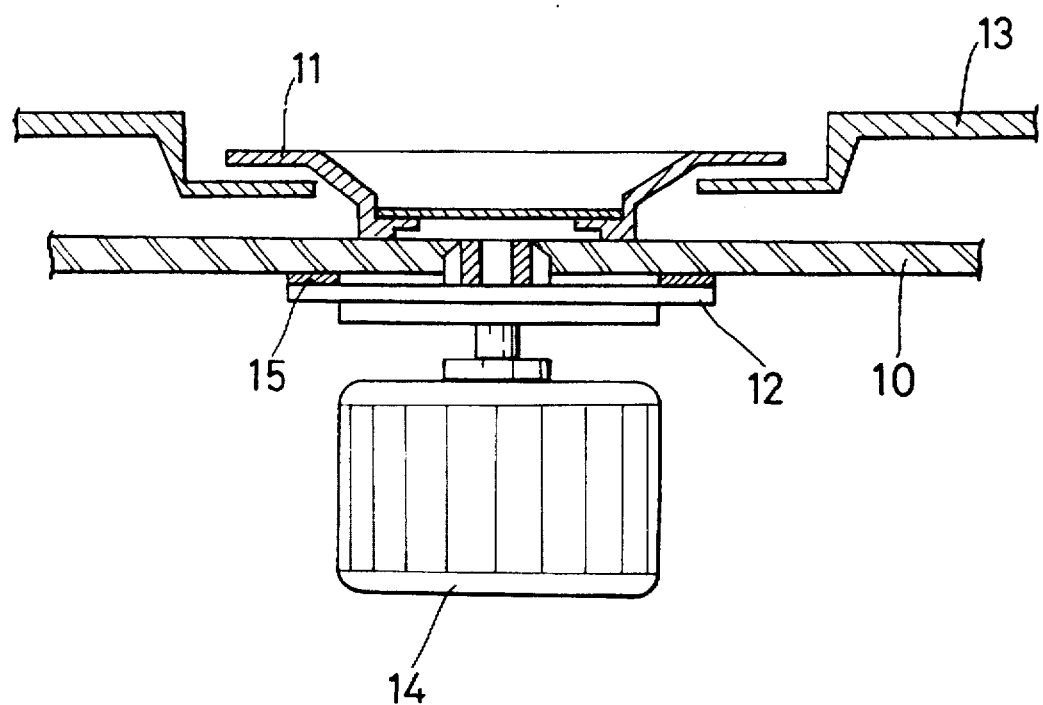
FIG. 1 is a sectional view showing a conventional disk centering apparatus of a compact disk drive.
Figure 2:
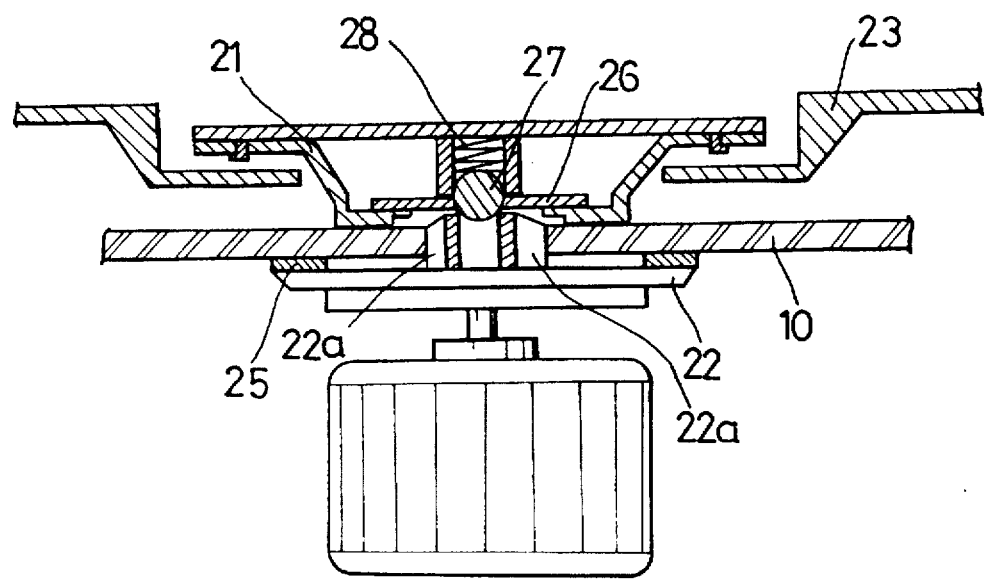
FIG. 2 is a sectional view showing a disk centering apparatus of a compact disk drive according to a preferred embodiment of the present invention.
Figure 3:
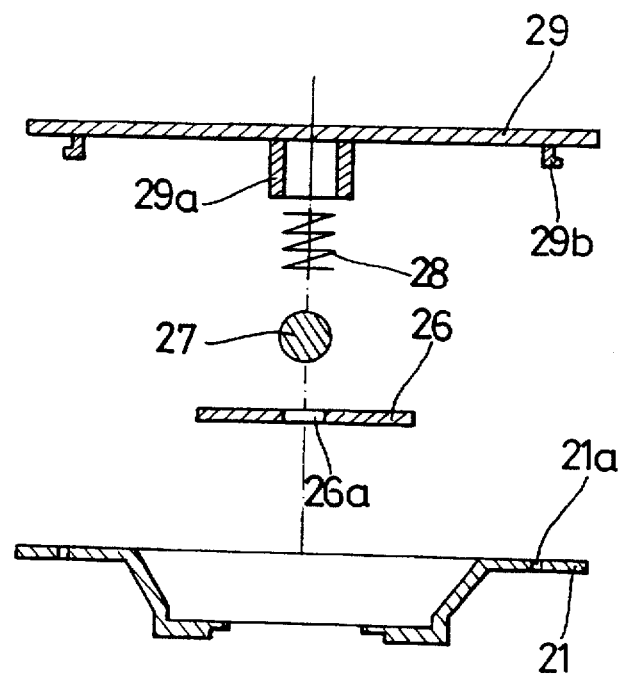
FIG. 3 is an exploded partial sectional view of the disk centering apparatus shown in FIG. 2.

As shown in FIGS. 2 and 3, a disk centering apparatus of a compact disk drive according to the preferred embodiment of the present invention includes a pulley spindle 21 for pressing a disk 10 with a predetermined force to prevent deviation of the disk 10, and a holder chuck 23 for preventing eccentric movement of the pulley spindle 21. A bracket spindle 26 is seated against the bottom of the pulley spindle 21, and the bracket spindle 26 has a through-hole 26a formed in the center thereof.

A metal ball 27, elastically biased by a spring 28, is seated in the through-hole 26a of the bracket spindle 26. Since the diameter of the metal ball 27 is greater than that of the through-hole 26a, the ball 27 presses the bracket spindle 26 downward due to the force of spring 28. Preferably, the spring 28 is a compression coil spring. Also, a cylindrical protrusion 29a, in which the spring 28 and the metal ball 27 are inserted, protrudes from a guide plate 29 for supporting the spring 28 and the metal ball 27.

The guide plate 29 is connected to the pulley spindle 21 by inserting a fixing hook 29b formed thereon into an insertion hole 21a formed on the pulley spindle 21. Also, the guide plate 29 can be connected to the pulley spindle 21 by adhesives, a bolt or rivet, or the like. Of course, the connection of the guide plate 29 to the pulley spindle 21 is intended not to be limited by a disclosed preferred embodiment of the present invention.

In operation, the disk 10 is placed on the turntable 22 and then pressed by the pulley spindle 21. The disk 10 is clamped by the pulley spindle 21 and a rubber damper 25 disposed on the turntable 22, and the metal ball 27 is seated on a central protrusion 22a of the turntable 22. In this state, when the disk 10 rotates at high speed, the metal ball 27 also rotates at high speed. Since the metal ball 27 having a predetermined mass rotates at high speed on an axis of rotation of the turntable 22, a moment of inertia of the metal ball is high. Accordingly, the vibration of the disk 10 having a relatively small mass is offset by rotation of the metal ball 27 which does not tend to vibrate.

The metal ball 27 is elastically biased by the spring 28 and thus presses the bracket spindle 26 and the bottom side of the pulley spindle 21 which contacts with the bracket spindle 26 toward the disk 10. Thus, the disk 10 is clamped stably by the pulley spindle 21 and the rubber damper 25 even during high-speed rotation, to prevent deviation of the disk 10.

It should be understood that the invention is not limited to the illustrated embodiment and that many changes and modifications can be made within the scope of the invention as defined by the appended claims.

What is claimed is:

1. A disk centering apparatus of a compact disk drive having a turntable on which a disk is seated and a pulley spindle for clamping the disk to the turntable, comprising:

a bracket spindle having a through-hole formed in a center thereof, said bracket spindle being disposed on a bottom surface of an inside of said pulley spindle, said pulley spindle contacting an upper surface of said disk;

a metal ball having a diameter which is larger than a diameter of said through-hole, said metal ball being seated in said through-hole of said bracket spindle;

a ball guide plate for supporting said metal ball, said ball guide plate being connected to said pulley spindle; and a spring disposed on said ball guide plate for elastically biasing said metal ball, said metal ball pressing said bracket spindle downward and said metal ball being seated on a central protrusion of said turntable; wherein vibration occurring due to an eccentric center of gravity of said disk during high speed rotation is suppressed spindle.

2. A disk centering apparatus of a compact disk drive according to claim 1, wherein said metal ball is disposed on an axis of rotation of said turntable and has a high moment of inertia.

3. A disk centering apparatus of a compact disk drive according to claim 2, wherein a protrusion is formed in the center of said turntable and said metal ball contacts and presses said protrusion when said disk is clamped.

4. A disk centering apparatus of a compact disk drive according to claim 1, wherein a protrusion is formed in the center of said turntable and said metal ball contacts and presses said protrusion when said disk is clamped.

5. A disk centering apparatus of a compact disk drive according to claim 1, further comprising:

a cylindrical protrusion extending from said ball guide plate, said spring and said metal ball being at least partially disposed in said cylindrical protrusion.

6. A disk centering apparatus of a compact disk drive according to claim 1, further comprising:

a fixing hook having a distal end and formed on said ball guide plate, and an insertion hole, into which said fixing hook is inserted, formed on said pulley spindle, such that after said fixing hook is inserted into said insertion hole, said distal end of said fixing hook projects from said insertion hole parallel to a lower surface of said pulley spindle and supports said pulley spindle.

* * * * *